(No Model.)
F. S. KRETSINGER.
METHOD OF MAKING RAKES.
No. 320,479. Patented June 23, 1885.
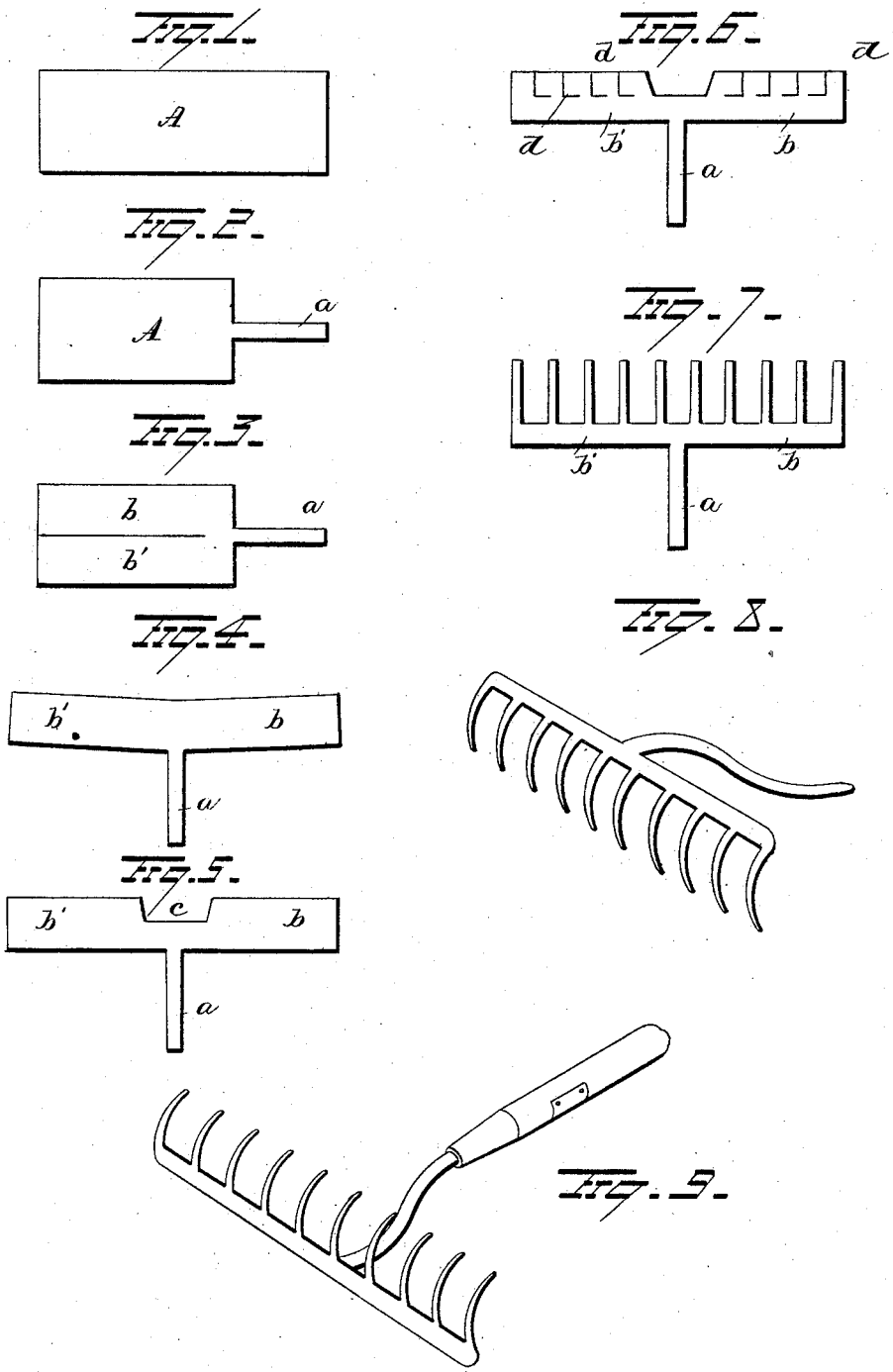
WITNESSES
P. J. Nottingham
Wm. T. Gill
INVENTOR
F. S. Kretsinger
By H. A. Seymour
ATTORNEY

UNITED STATES PATENT OFFICE.

FREDERICK SHERWOOD KRETSINGER, OF FORT MADISON, IOWA.

METHOD OF MAKING RAKES.

SPECIFICATION forming part of Letters Patent No. 320,479, dated June 23, 1885.

Application filed September 12, 1884. (No model.)

*To all whom it may concern:*

Be it known that I, FREDK. S. KRETSINGER, of Fort Madison, in the county of Lee and State of Iowa, have invented certain new and useful Improvements in Rakes; and I do hereby declare the following to be a full, clear, and exact description of the invention, such as will enable others skilled in the art to which it appertains to make and use the same.

My invention relates to an improvement in the manufacture of rakes.

Hitherto rakes have been constructed from a steel blank by drawing the blank down to form the shank, splitting the blank to form the head, cutting and drawing down the teeth, and crushing the shank into the head, or twisting it into position at right angles to the head, or both. The two latter steps are objectionable on account of weakening the head or shank.

The object of my present invention is to provide a rake constructed from a single blank of metal without crushing the shank into the head or twisting it, a further object being to provide a rake in which the shank shall be curved into such shape that it will admit of the use of the rake-head as a leveler, and in which the teeth shall be curved to admit of increased gathering capacity.

With these ends in view my invention consists in, first, drawing the shank from the end of a steel blank; secondly, splitting the blank; thirdly, opening the split portion; fourthly, pressing the opened-out portion into shape at right angles to and in the same plane with the shank; fifthly, cutting the teeth; sixthly, drawing the teeth; and, seventhly, curving the shank and teeth.

In the accompanying drawings, Figure 1 represents a bar of steel, and Figs. 2, 3, 4, 5, 6, 7, 8 represent the appearance of the bar at the end of the successive steps. Fig. 9 represents the rake attached to a handle.

A represents a plain bar of steel. A portion of the bar is first drawn down to the size and length required for the shank, as represented by $a$, Fig. 2. The bar is then split centrally into the two branches $b\ b'$, Fig. 3. The two branches are then opened, as shown in Fig. 4. They are then pressed into positions at right angles to the shank and kept in the same plane therewith, the central portion being recessed for a distance equal to the space between the two central teeth, as shown at $c$. The teeth-blanks are then cut by the angular cuts $d$, and drawn out, as shown in Fig. 7. The teeth, head, and shank now lie in the same plane, and the final step consists in bending the shank into goose-necked shape and the teeth into a curved shape, as shown in Fig. 8.

It will be observed that there has been no twisting or crushing of the shank into the head during the operation, and the shank is stronger, while the bend in the shank carries it out of the way of the soil when the head is used to level the surface or bevel the sides of a flower-bed. The gathering capacity is also increased by the curve of the teeth in connection with the bend in the shank, which latter carries the handle farther from the rake-head than the straight-shank construction.

Having fully described my invention, what I claim as new, and desire to secure by Letters Patent, is—

The method of manufacturing rakes, consisting, essentially, in forming the shank, splitting the blank and opening the split portion into shape on opposite sides of and in the same plane with the shank, cutting and drawing the teeth, and, finally, curving the teeth and the shank, substantially as and for the purpose set forth.

In testimony whereof I have signed this specification in the presence of two subscribing witnesses.

FREDERICK SHERWOOD KRETSINGER.

Witnesses:
A. A. POTTER,
GEO. M. HANCHETT.